US012717836B2

(12) United States Patent
Suhre et al.

(10) Patent No.: US 12,717,836 B2
(45) Date of Patent: Aug. 25, 2026

(54) IMPACT SCORE FOR ONTOLOGY CHANGES

(71) Applicant: INTERNATIONAL BUSINESS MACHINES CORPORATION, Armonk, NY (US)

(72) Inventors: Oliver Suhre, Stuttgart (DE); Thomas Hampp-Bahnmueller, Stuttgart (DE); Peter Gerstl, Holzgerlingen (DE); Yannick Saillet, Stuttgart (DE); Albert Maier, Tuebingen (DE); Michael Baessler, Bempflingen (DE)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 18/162,744

(22) Filed: Feb. 1, 2023

(65) Prior Publication Data

US 2024/0256591 A1 Aug. 1, 2024

(51) Int. Cl.
*G06F 17/27* (2006.01)
*G06F 16/35* (2019.01)
*G06F 16/36* (2019.01)

(52) U.S. Cl.
CPC ............ *G06F 16/367* (2019.01); *G06F 16/35* (2019.01)

(58) Field of Classification Search
CPC ...... G06F 16/35; G06F 16/367; G06F 16/374; G06F 16/36; G06F 16/951; G06F 16/55; G06F 16/3344; G06F 16/316; G06F 16/355; G06F 16/353; G06F 40/247; G06F 40/242; G06F 40/237
See application file for complete search history.

(56) References Cited

U.S. PATENT DOCUMENTS 10,445,170 B1 * 10/2019 Subramanian ......... G06N 20/10
2006/0064666 A1 3/2006 Amaru
2016/0162824 A1 6/2016 Dan
2017/0017644 A1 * 1/2017 Accardo ............... G06F 16/285
2017/0061001 A1 * 3/2017 Tonkin ................ G06F 16/3338
(Continued)

FOREIGN PATENT DOCUMENTS

EP 4258601 A1 * 10/2023 ......... H04L 63/1433

OTHER PUBLICATIONS

"Alerts and Notifications," Informatica Documentation, printed from the internet May 5, 2022, 3 pages.
(Continued)

*Primary Examiner* — Michael Ortiz-Sanchez
(74) *Attorney, Agent, or Firm* — Eric W. Chesley

(57) ABSTRACT

Described are techniques for a re-analysis of assignments of terms to assets. The techniques include detecting a change in a term ontology comprising a plurality of terms, and determining at least one selected from a group consisting of: a domain feature change vector (DFCV) for a domain of the term ontology affected by the change, and a term feature change vector (TFCV) for the term affected by the change. The techniques further include identifying assets for the re-analysis of the assignments of terms, wherein each of the identified assets is associated with an impact score value based on the DFCV and/or the TFCV, and performing the re-analysis of the assignments of terms for the identified assets ordered by the impact score value.

17 Claims, 8 Drawing Sheets

(56) References Cited

U.S. PATENT DOCUMENTS

| | | | | |
|---|---|---|---|---|
| 2020/0395001 | A1* | 12/2020 | Mohanty | G06F 16/3344 |
| 2021/0064829 | A1* | 3/2021 | Lavallée | G06F 40/30 |
| 2022/0229986 | A1* | 7/2022 | Narendula | G06F 40/253 |

OTHER PUBLICATIONS

"Informatica Enterprise Data Catalog," Informatica, 7 pages.
"Viewing changes made to your glossary objects," printed from the internet May 5, 2022, 1 page.
Javed et al., "Ontology Change Management and Identification of Change Patterns," Journal on Data Semantics, Jun. 2013, 4 pages.

* cited by examiner

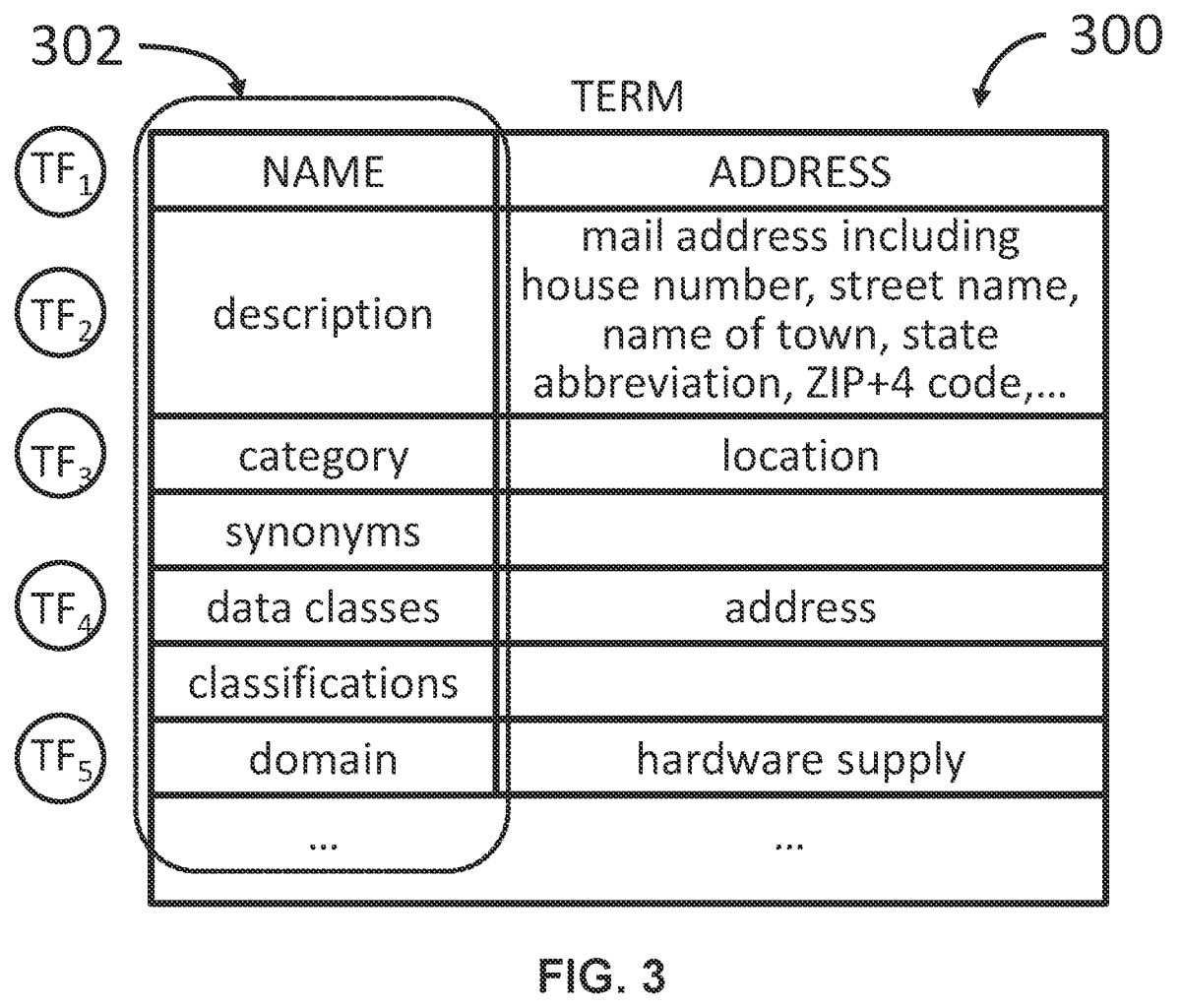

| NAME | ADDRESS |
| --- | --- |
| description | mail address including house number, street name, name of town, state abbreviation, ZIP+4 code,... |
| category | location |
| synonyms | |
| data classes | address |
| classifications | |
| domain | hardware supply |
| ... | ... |

FIG. 3

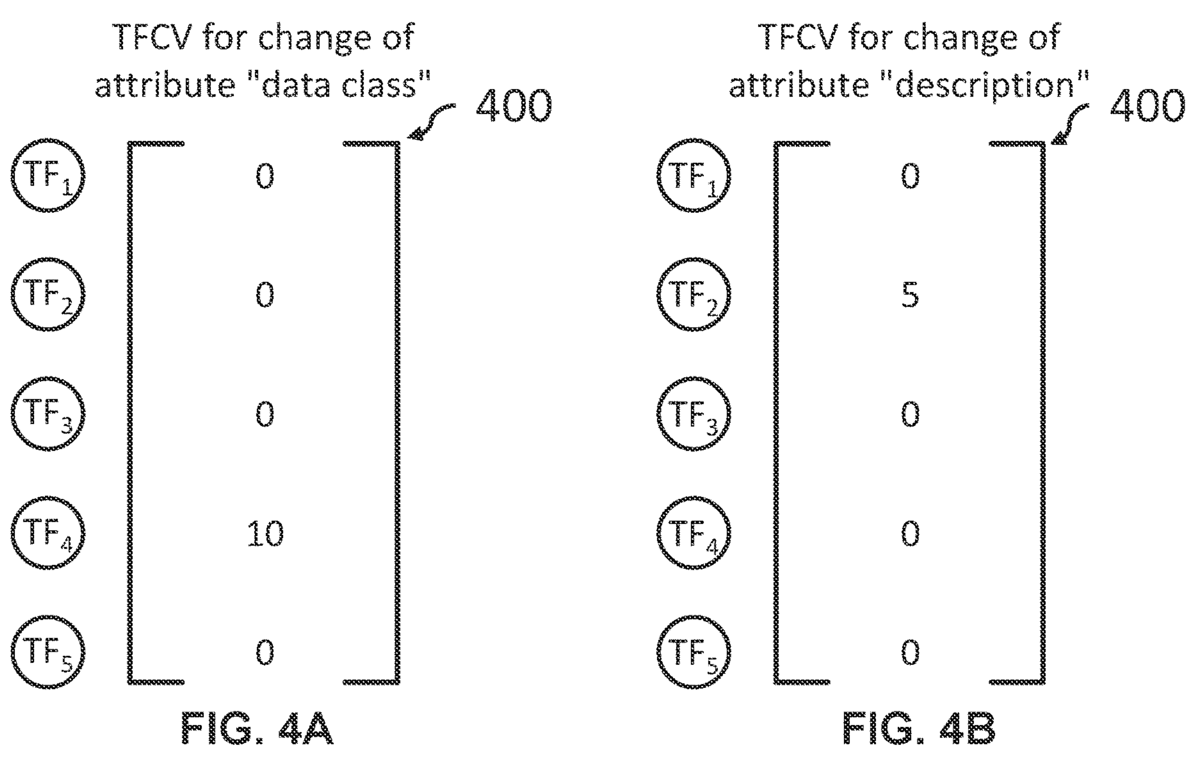
FIG. 4A
FIG. 4B
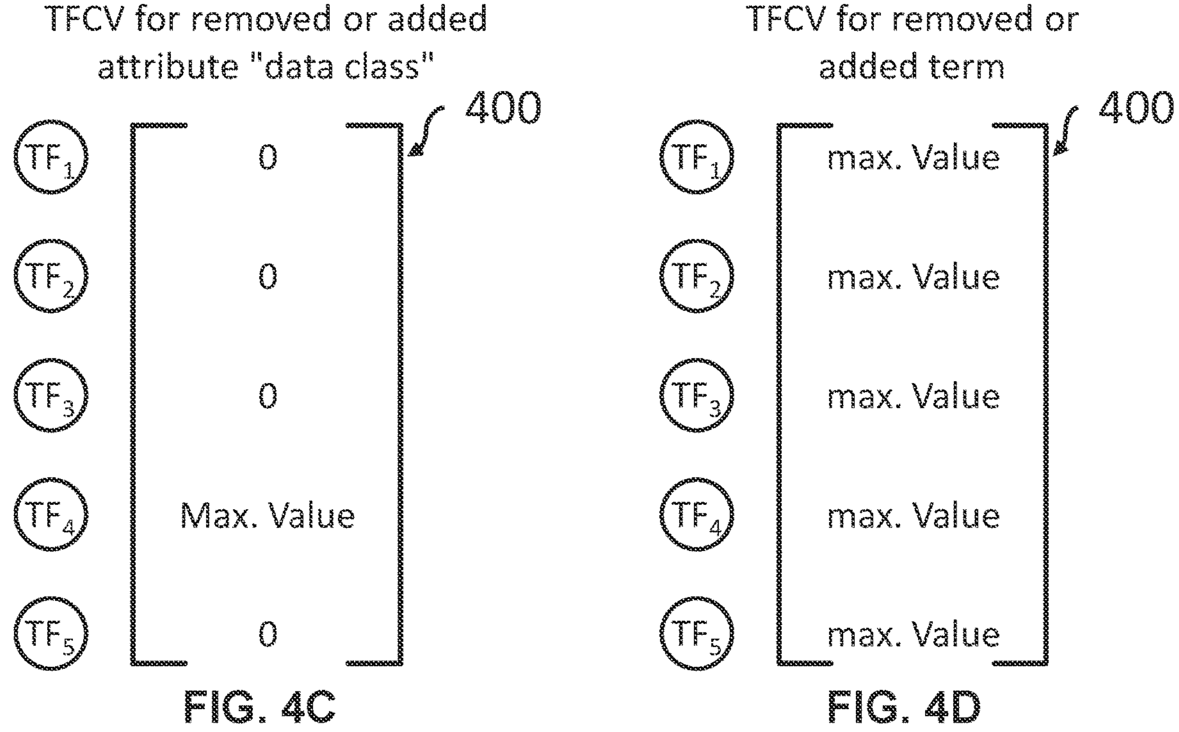
FIG. 4C
FIG. 4D asset

- terms
- data Class
- classification
- columns
- metadata of a source asset
- customer table
- document

IMPACT SCORE FOR ONTOLOGY CHANGES

BACKGROUND

The present disclosure relates generally to a re-adjustment of an ontology, and more specifically, to re-analysis of assignments of terms to assets.

In computer science and information science, an ontology encompasses a representation, formal naming, and definition of categories, properties, and relations between concepts, data, and entities that substantiate one, many, or all domains of discourse. More simply, an ontology is a way of showing how properties of a subject area are related, which is accomplished by defining a set of concepts and categories that represent the subject area.

SUMMARY

Aspects of the present disclosure are directed to a computer-implemented method for re-analyzing of assignments of terms to assets. The computer-implemented method comprises detecting a change in a term ontology comprising a plurality of terms, and determining at least one selected from a group consisting of: a Domain Feature Change Vector (DFCV) for a domain of the term ontology affected by the change, and a Term Feature Change Vector (TFCV) for the term affected by the change. The computer-implemented method further comprises identifying assets for the re-analysis of the assignments of terms, where each of the identified assets is associated with an impact score value based on the DFCV and/or the TFCV, and performing the re-analysis of the assignments of terms for the identified assets ordered by the impact score value.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

It should be noted that embodiments of the disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present disclosure are apparent from the examples of embodiments to be described hereinafter and are explained with reference to the examples of embodiments, to which the present disclosure is not limited.

Figure 1:
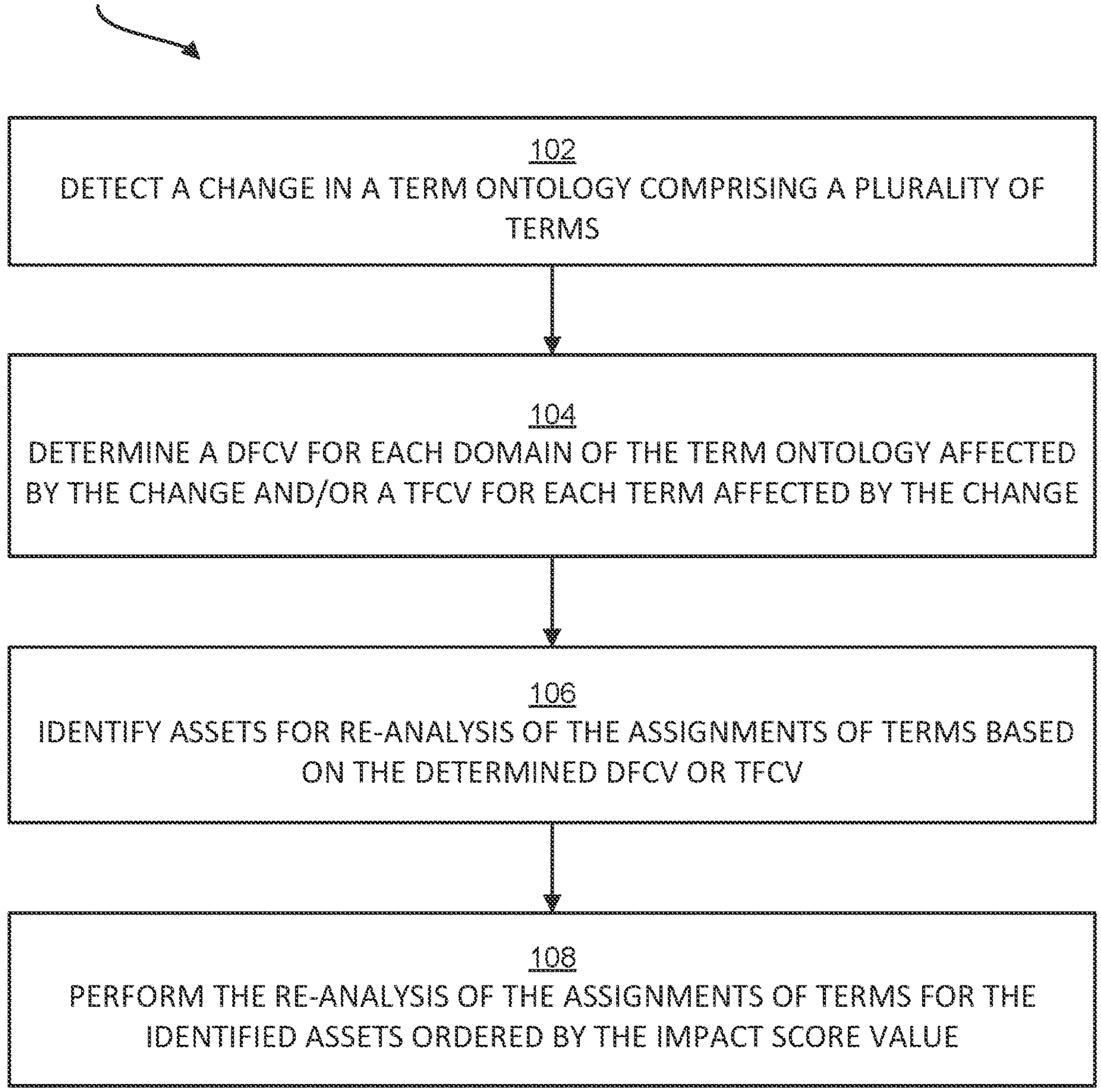

Example embodiments of the present disclosure will be described, by way of example only, and with reference to the following drawings:

FIG. 1 shows a block diagram of an example embodiment of a computer-implemented method for a re-analysis of assignments of terms to assets, in accordance with some embodiments of the present disclosure.

Figure 2:
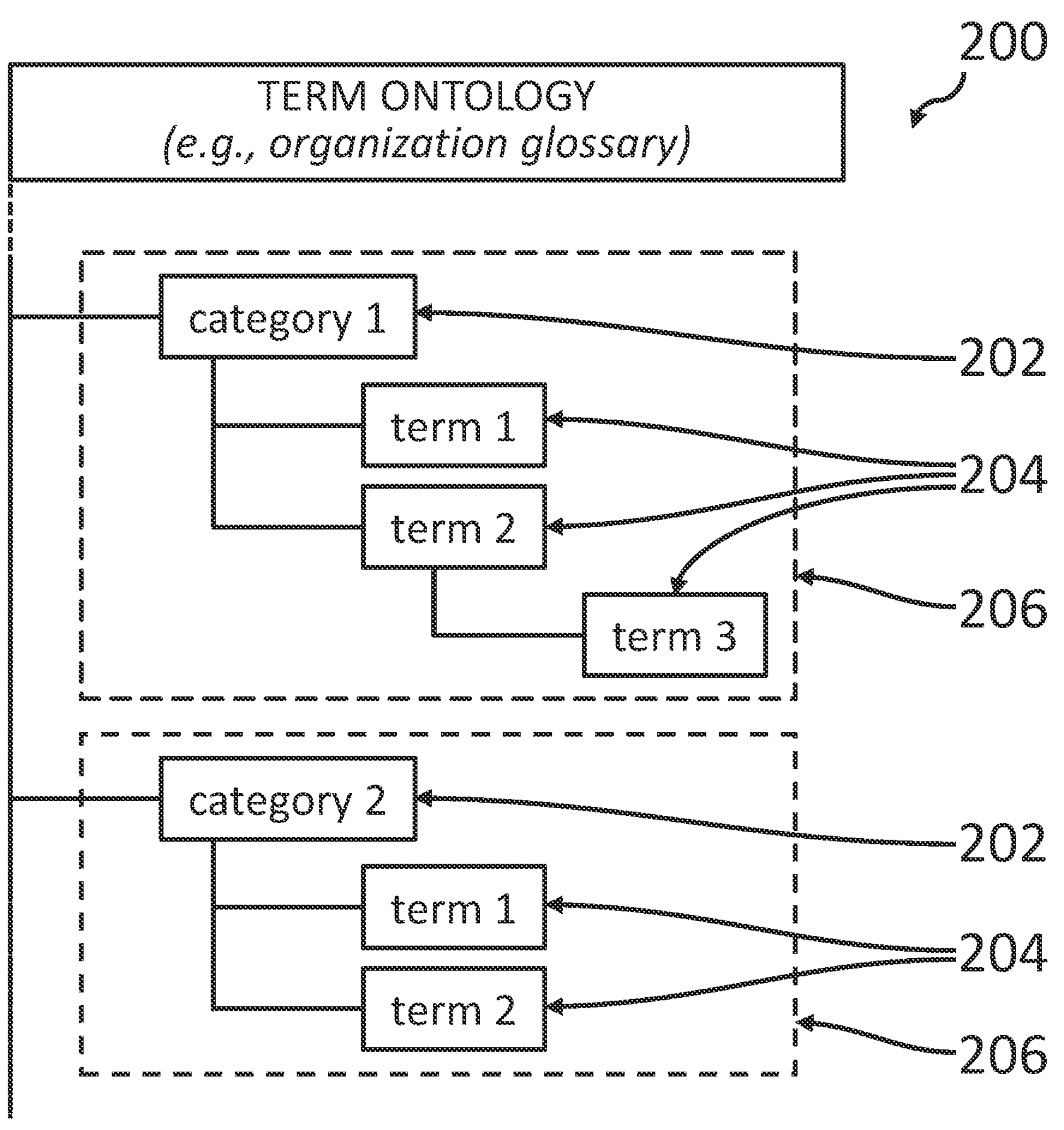

FIG. 2 shows a data structure of an example embodiment of a term ontology which can be implemented for the method of FIG. 1.

FIG. 3 shows a data structure of an example embodiment of a term which can be implemented for the method of FIG. 1.

FIG. 4A shows a data structure of a first embodiment of a term feature change vector (TFCV) which can be implemented for the method of FIG. 1.

FIG. 4B shows a data structure of a second embodiment of the TFCV which can be implemented for the method of FIG. 1.

FIG. 4C shows a data structure of a third embodiment of the TFCV which can be implemented for the method of FIG. 1.

FIG. 4D shows a data structure of a fourth embodiment of the TFCV which can be implemented for the method of FIG. 1.

Figure 5:
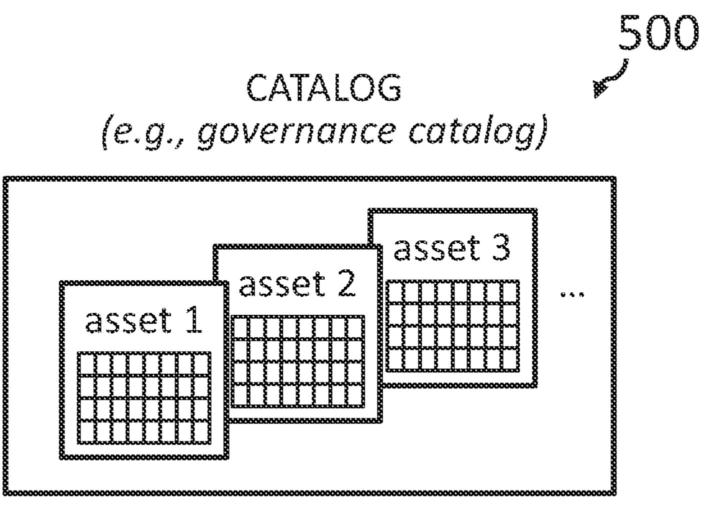

FIG. 5 shows a data structure of an example embodiment of a catalog to which the method of FIG. 1 can be applied.

Figure 6:

FIG. 6 shows a data structure of an example embodiment of an asset, to which the method of FIG. 1 can be applied.

Figure 7:
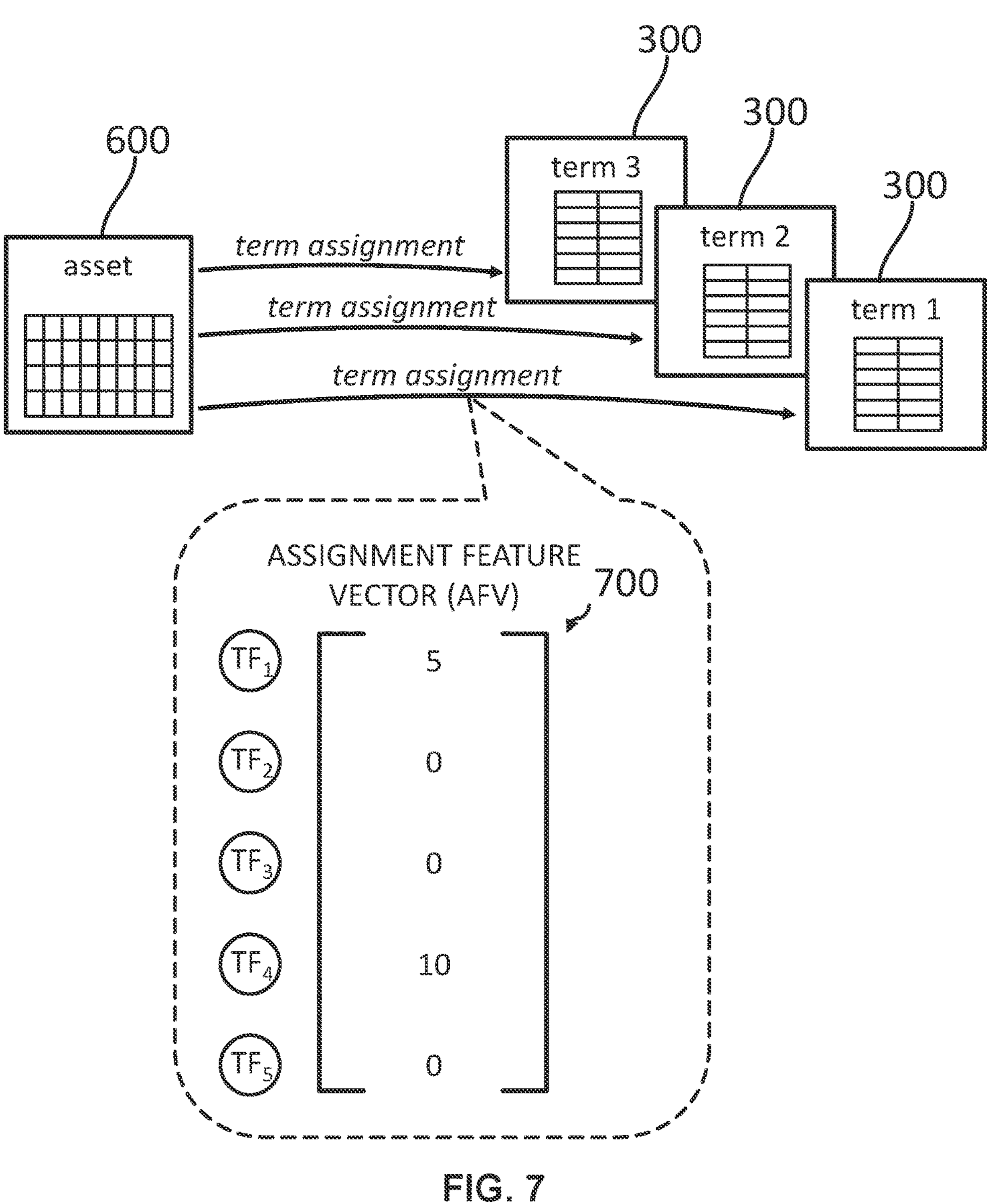

FIG. 7 shows a data structure of an example embodiment of an assignment feature vector (AFV), which can be associated with each term assignment for the method of FIG. 1.

Figure 8:
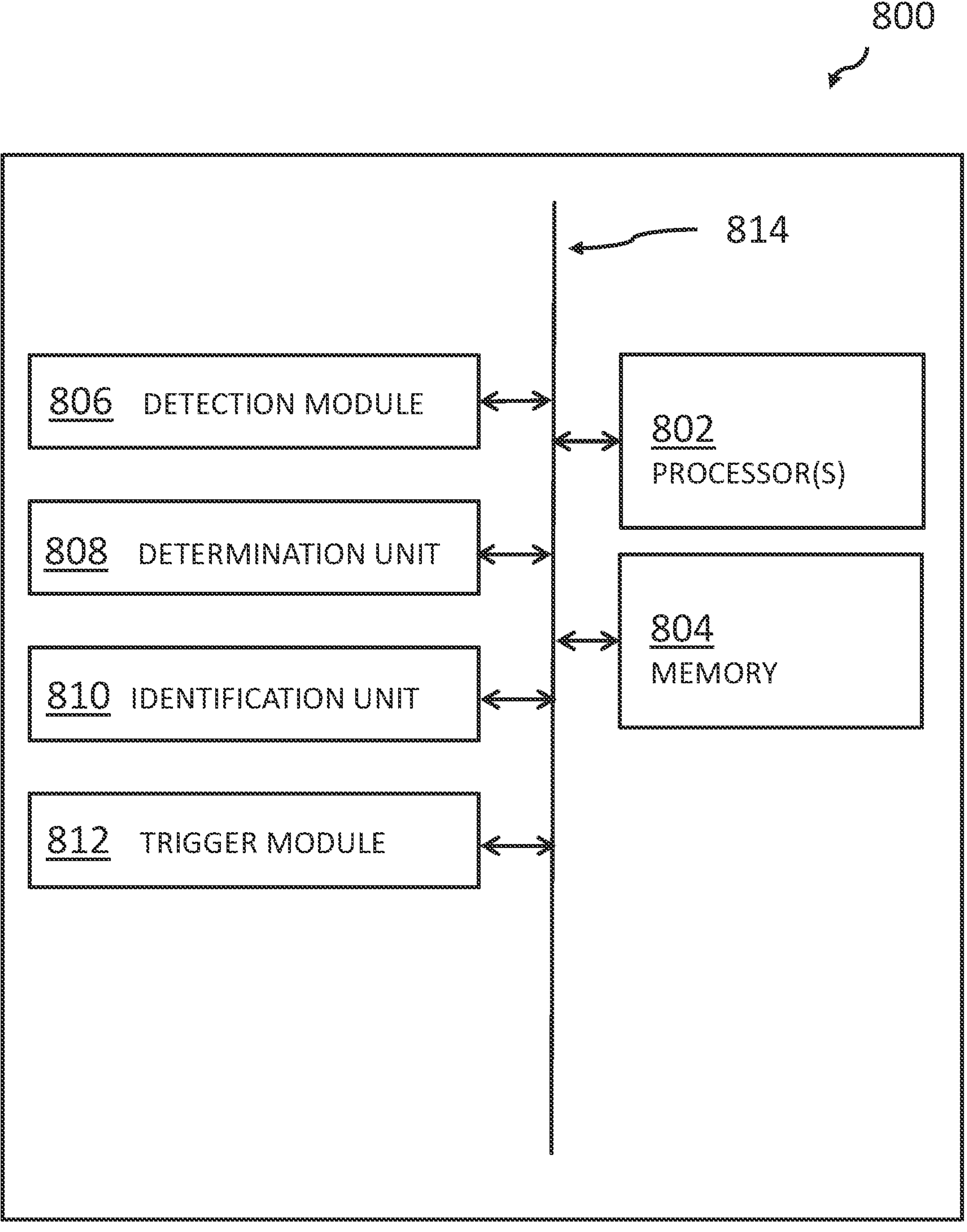

FIG. 8 shows a block diagram of an example embodiment of a re-analysis system for assignments of terms to assets, in accordance with some embodiments of the present disclosure.

Figure 9:
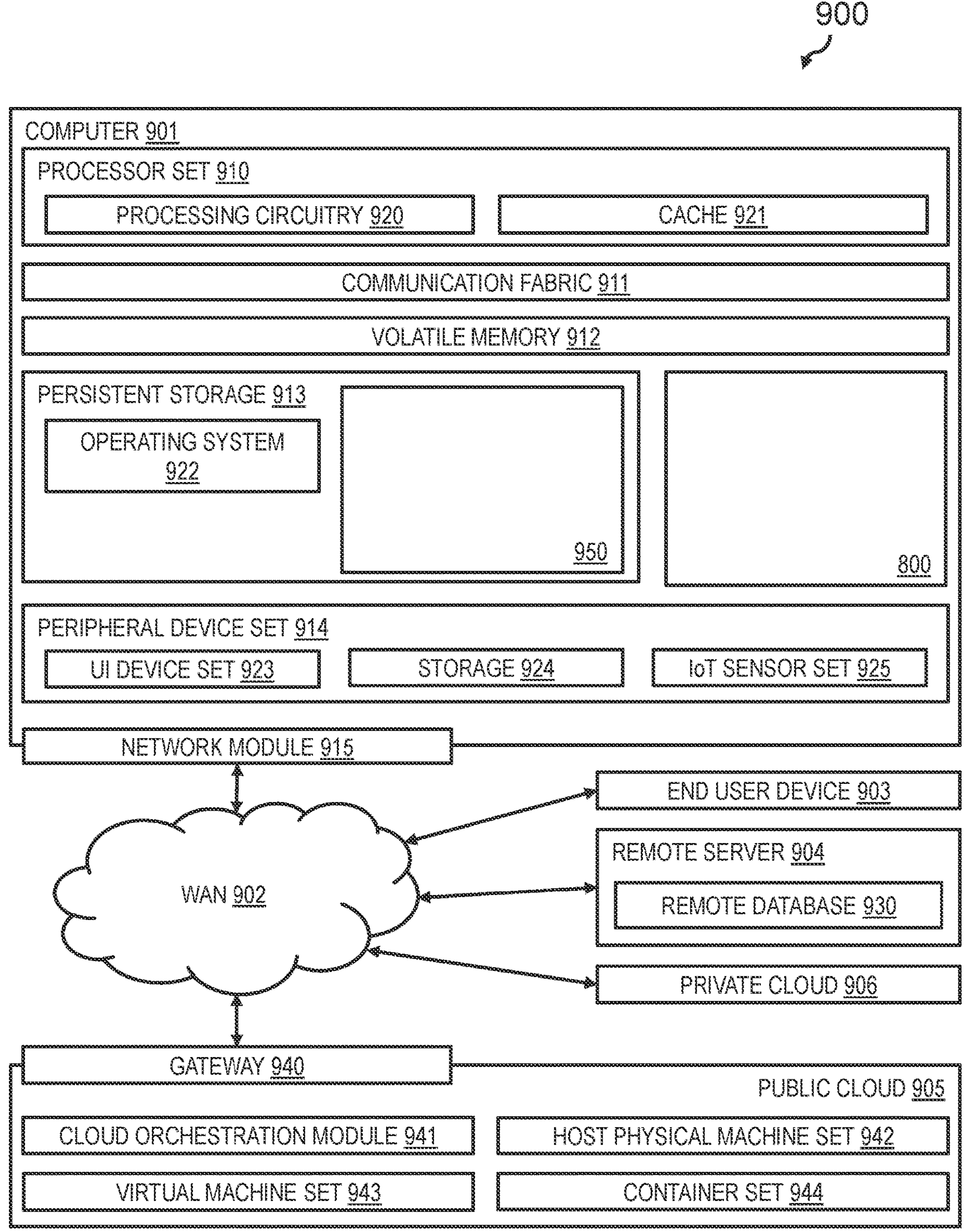

FIG. 9 shows an example embodiment of a computing system comprising the system according to FIG. 8.

DETAILED DESCRIPTION

In the context of the present disclosure, the following technical conventions, terms and/or expressions can be used:

The term "analysis" or "re-analysis" can denote a computer-implemented and non-manual procedure that can assign one or more terms to an asset. Alternatively, or in addition, the re-analysis can be an analysis performed on an asset that already has one or more terms assigned with it. For example, the re-analysis can be a repetition of a previous analysis taking into account the change in the term ontology.

A "term ontology" can encompass a representation, formal naming, and/or definition of categories, properties, and relations between terms that substantiate one, many, or all of the assets. Optionally, the term ontology can have the structure of a graph or a tree. Alternatively, or in addition, the term ontology can be a glossary of terms.

A "term" can be a component of the term ontology to which typically a plurality of terms belong. Optionally, the terms can be nodes (e.g., vertices) of a graph or a tree representing the term ontology.

An "asset" can encompass any data and device that supports information-related activities. Alternatively, or in addition, the assets can be metadata or a digital twin representing a physical asset. Alternatively, or in addition, the asset can encompass data science projects, data science models, notebooks, and applications.

The term "change" can encompass a change within one or more terms of the term ontology, e.g., a change in a term feature (such as a definition or a description) of the term. Alternatively, or in addition, the change can encompass a change in a relation between terms of the term ontology.

Alternatively, or in addition, the change can encompass a change in position (e.g., hierarchy level or domain) of a term within the term ontology.

The term "term feature change vector" (TFCV) can denote a vector that is indicative of one or more term features of the term being subject to the change. For example, different components of the TFCV can correspond to different term features of the term. A Zero value of the components of the TFCV can be indicative of the respective term feature of the term being unchanged. Non-zero (or positive) values of the components of the TFCV can be indicative of a change of the respective term feature of the term. For example, each value of one of the components of the TFCV can be indicative of a degree of the change of the respective one of the term features of the term. Alternatively, or in addition, each term of the term ontology affected by the change can be associated with a TFCV.

The term "domain" can denote a connected subset of the term ontology. For example, all terms that depend directly or indirectly on a head node (e.g., a category) in a tree representing the term ontology can form a domain of the term ontology. Alternatively, or in addition, all terms that are connected by at most a predefined number of edges on the shortest path to a head node (e.g., a category) within a graph representing the term ontology can form a domain of the term ontology.

The term "domain feature change vector" (DFCV) can denote a vector that is indicative of a change within a domain of the term ontology. For example, the DFCV can be defined as the sum of all TFCV of all terms within the domain. Alternatively, or in addition, each domain of the term ontology affected by the change can be associated with a DFCV.

The term "assignment feature vector" (AFV) can denote a vector that is indicative of the relevance of the term features of a term for assigning the term to an asset. For example, different components of the AFV can correspond to different term features of the term. Preferably, the components in the AFV, the TFCV and the DFCV can be equally ordered in the sense of term features. Zero values of the components of the AFV can be indicative of the respective term features of the term being irrelevant for the assignment. Non-zero (or positive) values of the components of the AFV can be indicative of the respective features of the term being relevant for the assignment. Each value of one of the components of the AFV can indicate a degree of the relevance of the respective one of the features of the term. Alternatively, or in addition, each assignment of one of the terms to one of the assets can be associated with an AFV.

The term "impact score value" can denote an estimate or a prediction for the change in the term ontology causing, implying or requiring a change in the assignment of the terms. Each impact score value can be associated with one of the assets. For example, as each AFV is associated with an assignment of one of the terms to one of the assets and as each TFCV or DFCV is associated with one of the terms or one of the domains of the term ontology, the impact score value can be determined per asset based on a combination of the one or more AFVs and the one or more TFCVs or DFCVs related to the asset.

The term "assignment confidence value" can be an indicator for the robustness of an existing assignment (e.g., resulting from a previous analysis) under the change. The "assignment quality value" can be an example of an assignment confidence value that is indicative of whether or not other terms can have to be assigned to the asset. The assignment quality value can be used as the impact score if the change comprises an addition or removal of one or more terms in the term ontology.

The "type of an analysis" can distinguish between two or more different processes that can be used for the analysis, including the re-analysis, of an asset. For example, one type of the analysis can use term embedding (e.g., word embedding based on the name of the term or sentence embedding based on the description of the term) to assign a term to an asset. Alternatively, or in addition, another type of the analysis can use an application that is associated with the asset to assign a term (corresponding to the application) to the asset. If a re-analysis is triggered for an asset based on the determined impact score value, the same type of the analysis that was previously used for the asset can also be used to re-analyze the asset.

A "term assignment", (e.g., an assignment of one or more of the terms of the term ontology to one or more of the assets) can be the result of the analysis or the re-analysis of the respective one or more assets. The term assignment can be implemented (e.g., stored) as a link in the asset indicative of the assigned one or more terms.

In light of the ever-growing amount of data structured and semi-structured data, information management and information governance remain on the top priority list of information management executives. The more information technology (IT) and business are intertwined, and the larger the amount of managed data becomes, the more important it becomes to better structure unstructured and/or semi-structured data in the form of business glossaries or term ontologies that also help to govern the use of data, and giving the business side an orientation in the hierarchies of term definitions and metadata. On the technical side, the terms often have a clear hierarchy which might not be so much the case on the user side because it might not be transparent enough for the users.

Therefore, in the day-to-day data governance work, users need to maintain these business glossaries as ontologies in the form of a tree-like or graphical or graph structure. The terms used can be described in natural language so that users have the opportunity to understand them and speak a common language together with more technically oriented developers and data/application managers. This can be a requirement for tagging and classifying data, which can be a competitive advantage when managing data in large data warehouses, data lakes, and/or analytics-oriented data cubes. This is also may be a requirement to give users the ability for self-service analytics.

However, as organizations evolve, business glossaries do not remain static, but change frequently over time. Whenever there are changes to the glossary, data sets that are assigned to glossary terms need to be updated. This can also trigger a change in the tagging and classification of data as well as in the tree-like and/or graphical structure. With an ontology size of tens of thousands of terms, there may not be enough time for all of these changes before the next round of changes appears on the horizon. Hence, it is difficult to keep the ontology current and more or less error-free. Also, this process is labor-intensive and can take several months depending on the kind of change.

Changes to the ontology can be simple term name changes, new terms, remove terms, termed description changes (e.g., metadata changes) term relationships, terms splits or term unions. Depending on the changes, smaller or larger amounts of data might be affected.

Hence, there is a technical need to provide a tool to speed up the process of analyzing consequences of a change of one term in an ontology to other terms, other classifications and the ontology as a whole.

The disclosed computer-implemented method for a re-analysis of assignments of terms to assets can offer multiple advantages, technical effects, contributions and/or improvements:

The conventional re-analysis of all assets can be time-consuming and may use up operational computing resources. By applying the re-analysis only to the identified assets and in the order of the impact score value associated with each of the identified assets, embodiments of the re-analysis technique can significantly reduce the number of assets that undergo re-analysis. Furthermore, the operative impact can be minimized by firstly re-analyzing the term assignment of those assets that are most likely impacted by the change in the term ontology according to the impact score value.

Embodiments of the re-analysis technique can avoid altering term assignments by a re-analysis due to a change within the re-analysis process, e.g., due to a change in the type of the re-analysis compared to the previous analysis of an asset. For example, term assignments can be altered only if necessitated by the change in the ontology. Thus, an evolution of the term assignments can be more continuous.

Aspects of the present disclosure enable a time critical management of ontologies bridging the language gap between IT users and general users if changes apply to the interpretation of available data. This can happen if used technology changes, if the organization changes, or new products and services are offered, or if other changes to the relationship between IT management and the rest of an organization are planned and implemented. Aspects of the present disclosure speed up the process of ontology management enabling users, as well as the IT department, to keep up with the changes to the ontology. Traditionally, such ontology changes may have required several months so that a new change may have become necessary within the time periods required for the previous change. This has meant that an ontology may never have been current which clearly can limit the value of the ontology. Accordingly, aspects of the present disclosure can make it easier to keep an existing ontology current or expand into new content regions with additional terms to manage even more assets.

In the following, additional aspects of the present disclosure are described.

In some embodiments, the step of identifying the assets for re-analysis can comprise a sub-step of determining the impact score values based on the determined DFCV and/or the determined TFCV for a plurality of assets from which the identified assets are selected, e.g., the associated impact score value is equal to or greater than a predefined first threshold value the associated impact score value is equal to or greater than a predefined first threshold value.

Based on the rapidly determined impact score value, the complex re-analysis can be avoided for most of the assets, and the changes in the term assignments necessitated the change in the term ontology can be performed in real-time by focusing on those assets that are impacted by the change in the term ontology.

Herein, referring to a "first" value may or may not imply the existence of a "second" value. Furthermore, a value can be "predefined" if it is specified in a technical standard or set in a system configuration.

According to some embodiments, the re-analysis can be performed for the identified assets ordered by the impact score value until the associated impact score value is equal to or less than a predefined second threshold value and/or until the re-analysis does not yield any further change of the assignments of the terms.

By combining the ordering according to the impact score values with a stop criterion, such as the predefined second threshold value or the re-analysis yielding no further change in the term assignments, the number of assets that have to undergo re-analysis can be limited.

The predefined second threshold value can be equal to or less than the predefined first threshold value. Alternatively, or in addition, the re-analysis can be performed until the re-analysis of a predefined number (e.g., 2 or 10) or a predefined portion (e.g., 10%) of the identified assets (e.g., consecutive in the order of the impact score value) yield no further change in the term assignments.

According to some embodiments, the re-analysis can be performed in the order of decreasing impact score values. As a result, the most impacted assets can have their term assignment updated first.

The impact score values associated with the assets can be indicative of a likelihood for a change of the assignments of terms to the respective assets. Thus, the assets which have the highest likelihood of being impacted by the change can be the first to be re-analyzed.

Alternatively, or in addition, the impact score values associated with the assets can be indicative of an expected change of an assignment confidence value for the terms assigned to the respective assets, e.g., due to a change of the assignments of terms to the respective assets. The previous analysis of the assets, which yields the previous term assignments, can also determine the assignment confidence value (e.g., a value in the range of 0 to 100%) for each term assignment. If there is a change in the term ontology, then it is likely that the assignment confidence value will change (e.g., will be increased or decreased) as a result of the re-analysis. For example, the expected change of the assignment confidence value can be indicative of a likelihood that the confidence for a given, or an individual, assigned term may improve due to the re-analysis.

Alternatively, or in addition, the impact score value associated with an asset can be indicative of an expected change of an assignment quality value, e.g., due to a change of the assignments of terms to the respective assets. The assignment quality value can be an example of the above-mentioned confidence value that is indicative of whether the assigned term is an absolute best match as opposed to a relative best match that finds the best term within the current term ontology. Alternatively, or in addition, the assignment quality value can be indicative of a ground truth as to the quality of the term assignment. For example, the expected change of the assignment quality value can be indicative of a likelihood that the re-analysis can assign a better term than the term currently assigned to the asset, e.g., relative to another assigned term of the previous or changed term ontology.

The impact score value can be an increasing (optionally, a monotonically increasing) function of at least one selected from a group consisting of: the likelihood for change, the expected change of assignment confidences, and the expected change of assignment quality.

The change of a term assignment can also be referred to as term assignment change or briefly assignment change.

According to some embodiments, the change in the term ontology comprises at least one selected out of the group consisting of: a term being added to the term ontology, a term being removed from the term ontology, a change of a term name of the term in the term ontology, a change of a term description of the term in the term ontology, a change of a term relation between at least two of the terms in the term ontology, a term split of a term in the term ontology, and a term union of at least two of the terms in the term ontology (e.g., more or less any type of change).

Alternatively, or in addition, the change can comprise a change of one or more term features of one or more terms in the term ontology. The term name, the term description, and the term ontology can be examples of the term features.

According to some embodiments, each of the assignments of terms comprise at least one selected out of the group consisting of: an assignment confidence value indicative of a confidence that the assigned term matches the respective asset, an indicator of a type of an analysis of the respective asset used to create the assignment, an indicator of a type of the re-analysis of the respective assignment, and an assignment feature vector (AFV). However, other options are possible. Components of the AFV can be indicative of a weight value for each term feature of the assigned term. The analysis or the re-analysis determines whether or not to assign the term to the respective asset depending on the term features weighted according to the respective weight values.

The term features can also be referred to as features of the terms or briefly as features.

Herein, the analysis can refer to a process that creates the term assignments, e.g., initially and/or irrespective of existing assignments or changes in the term ontology. The re-analysis can refer to a process that creates or verifies or updates (e.g., changes or replaces or adds or removes) the term assignments depending on the determined impact score value and/or based on existing term assignments and/or responsive to the detected at least one change in the term ontology. The same process (e.g., the same type of analysis) can be used for the analysis and the re-analysis.

According to some embodiments, the term features of the terms comprise at least one selected out of the group consisting of: a name of the respective term, a description of the respective term, a term relation of the respective term to one or more other terms in the term ontology, an asset relation of the respective term to one or more other assets, a data class of the respective term, a classification of the respective term, and a domain in the term ontology which can comprise the respective term. Other options are possible.

The relationship can be indicative of the respective term being dependent on (e.g., subordinate to) another term of the term ontology. Alternatively, or in addition, the relationship can be indicative of one or more synonyms (e.g., one or more other terms being synonymous) in the term ontology.

Each domain in the term ontology can be defined by a head term and/or a category. The domain can comprise all terms that are dependent (e.g., directly or indirectly) on the head term and/or belong to the category. The relationships between the terms of the term ontology can define a hierarchical structure (e.g., a tree structure) of the term ontology.

According to some embodiments, the impact score values associated with the assets can be determined based on a scalar product of the TFCV and the AFV of the term (or each term) assigned to respective asset. Alternatively, or in addition, the impact score values associated with the assets can be determined based on a scalar product of the DFCV and the AFV of the term (or each term) assigned to respective asset.

The impact score value can be the sum of the scalar products of the TFCV and the AFV over all term assignments of the respective asset. In other words, the scalar product between the TFCV and the AFV can be determined for each of the term assignments of the respective asset, and the impact score value associated with the respective asset can be the sum of the scalar products determined for the respective asset. For example, the scalar product can be determined for each TFCV of the one or more terms that are assigned to the respective asset and affected by the determined at least one change and/or for each AFV of the one or more terms assigned to the respective asset.

Alternatively, or in addition, the impact score value can be the sum of the scalar products of the DFCV and the AFV over all term assignments of the respective asset. In other words, the scalar product between the DFCV and the AFV can be determined for each domain comprising one or more terms assigned to the respective asset, and the impact score value associated with the respective asset can be the sum of the scalar products determined for the respective asset. For example, the scalar product can be determined for each DFCV of a domain that is assigned to the respective asset and affected by the determined at least one change and/or for each AFV of each term assigned to the respective asset.

According to some embodiments, the assets can be identified, or the impact score values can be determined, based on the TFCV if a change of a single term in the term ontology is detected. Alternatively, or in addition, the assets are identified, or the impact score values can be determined, based on the DFCV if the detected at least one change is at least one selected from a group consisting of: changes of multiple terms in the term ontology, a term being added to the term ontology, and a term being removed from the term ontology. For example, the DFCV can be indicative of the change caused by removing a term from the domain, while the TFCV corresponding to the removed term can be unavailable, e.g., because each TFCV has to be associated with a term existing in the current term ontology.

According to some embodiments, components of the TFCV can comprise a predefined or maximum value for each feature of a removed term and/or for each feature of an added term. Alternatively, or in addition, one or more components of the TFCV can be zero if the corresponding one or more features of the term are not affected by the determined at least one change. Alternatively, or in addition, the DFCV of a domain of the term ontology can correspond to the sum of the TFCVs determined for the terms in the domain.

Preferably, if a term can be removed (e.g., deleted) from the term ontology, the corresponding TFCV can exist with each entry being the predefined or maximum value. As a result, the TFCV can indicate the maximum change for a removed term.

According to some embodiments, the assets can be physical assets (e.g., a physical representation of a document or table or metadata representing the physical asset). Alternatively, or in addition, the assets can be tables, e.g., customer tables. The tables can be included in a database or can be represented by a file including comma-separated values (CSV). Alternatively, or in addition, the assets can be documents. Alternatively, or in addition, the assets can be metadata of source assets.

For example, the technique of analysis and re-analysis for term assignments can be applied to a metadata store comprising only metadata of other assets (which are referred to as the source assets). The assets, as such, are not included in the data store to which the re-analysis of the term assignments can be performed. The re-analysis of the term assignments can be performed on a database comprising the assets in a metadata store that references the assets without including the assets.

According to some embodiments, the method can further comprise using a machine-learning system or a data classification system for the identifying of the assets and/or for the determining of the impact score values. For example, the machine-learning system or data classification system can be used to determine the impact score instead of a deterministic impact score determination such as the above-mentioned scalar product.

According to some embodiments, the machine learning can comprise continuously re-training the machine-learning system based on new data of the first or second threshold value for changes of the assignments of the terms. This way, the disclosed technology can become even faster in reacting to required ontology changes.

In the following, a detailed description of the figures will be given. All instructions in the figures are schematic. First, a block diagram of an example embodiment of a computer-implemented method for a re-analysis of assignments of terms to assets is given. Afterwards, further example embodiments, as well as example embodiments of a re-analysis system for assignments of terms to assets will be described.

FIG. 1 shows a block diagram of an example embodiment of the computer-implemented method 100 for a re-analysis of assignments of terms to assets. The method 100 comprises detecting, 102, a change in a term ontology comprising a plurality of terms, and determining, 104, a domain feature change vector (DFCV) for a domain of the term ontology affected by the change, and/or a term feature change vector (TFCV) for the term affected by the change.

The method 100 also comprises identifying, 106, assets for the re-analysis of the assignments of terms, wherein each of the identified assets is, in particular also only one, associated with an impact score value based on the determined at least one of the DFCV and the TFCV, and performing, 108, the re-analysis of the assignments of terms for the identified assets ordered by the impact score value.

Herein, the assignments of the terms can also be referred to as term assignments, and a domain can be affected by the detected at least one change if the domain comprises at least one term, or a predefined or determined number of terms, affected by the at least one change.

FIG. 2 shows a data structure of an example embodiment of a term ontology 200 which can be implemented for the method 100. The term ontology can be represented by a tree data structure. Each term 204 can be a child node of either another term 204 or a category 202. Thus, all terms 204 depend directly or indirectly on a category 202 that defines the domain 206 of the term ontology 200.

While categories 202 are illustrated in the embodiment of FIG. 2 as the highest hierarchy level of nodes (closest to the root of the tree representing the term ontology 200), the tree can comprise different levels of categories. Furthermore, the categories can also be terms, e.g., the categories can have the term features described herein and/or can be assigned to assets.

FIG. 3 shows a data structure of an example embodiment of a term 300 that can be implemented for the method 100 and/or in at least one or each of the nodes of the term ontology 200.

Each term 300 can comprise one or more term features 302 which can be attributes of the term 300. Furthermore, a list of term features 302 can be selected out of a set of term features 302, e.g., as indicated by the labels $TF_1$ to $TF_5$ in FIG. 3. The list of term features 302 should be used consistently for both the TFCV and/or the DFCV, and the AFV, so that the impact score value can be computed by the scalar product of the TFCV and/or the DFCV, and the AFV.

Each of FIGS. 4A, 4B, 4C, and 4D shows a data structure of an example embodiment of a term feature change vector (TFCV) 400 that can be implemented for the method 100. The TFCV 400 can be determined responsive to, or as part of, the detecting, 102, of the change in the term ontology 200.

When an existing term 300 is changed, the corresponding TFCV is determined. FIG. 4A schematically illustrates a change of the data class of the term 300. The value "10" of the TFCV 400 component corresponding to the term feature "data class" indicates the degree of change for the term feature.

FIG. 4B schematically illustrates a change of the description of the term 300. The value "5" of the TFCV 400 component corresponding to the term feature "description" indicates that the change of the description is minor compared to the change of the data class in the embodiment of FIG. 4A.

As schematically illustrated in FIG. 4C, if a term feature 302 is removed or added from the list of term features, the corresponding component in the TFCV 400 can be set to a predefined maximum value. The predefined maximum value can be the greatest value that can be assumed by a change of the term feature. Alternatively, the predefined maximum value can be a dedicated value (e.g., a symbol) indicative of the removal of the corresponding term feature.

Similarly, as illustrated in FIG. 4C, if a term feature 302 is added to the list of term features, the corresponding component in the TFCV 400 can be set to the predefined maximum value. The predefined maximum value can be a dedicated value (e.g., a symbol) indicative of the inclusion of the corresponding term feature 302.

As schematically illustrated in FIG. 4D, if an entire term 300 is removed or added from the term ontology 200, all components in the TFCV 400 are set to a predefined maximum value. The predefined maximum value can be the greatest value that can be assumed by a change of an individual term feature. Alternatively, the predefined maximum value can be a dedicated value (e.g., symbol) indicative of the removal or inclusion of the term 300 in the term ontology 200.

The technique can be applied to any data store, such as catalog 500 (e.g., a governance catalog) comprising a plurality of assets, which is schematically illustrated in FIG. 5. The catalog 500 can comprise assets of different data types, or combinations of structured data assets and unstructured data assets. For example, at least one or each of the assets can store metadata about a source asset, such as a customer table or a document.

FIG. 6 shows exemplary data and exemplary data structures of example embodiments of the assets, to which method 100 can be applied, or that can be comprised in the catalog 500.

The terms can be assigned to the assets (e.g., the metadata of the source assets) by performing the (e.g., initial) analysis of the assets, referred to as the previous analysis prior to the re-analysis. One or more terms 300 of the term ontology 200 can be assigned per asset 600. If the asset 600 comprises columns, one or more terms 300 of the term ontology 200 can be assigned per column.

Each term assignment can be done (e.g., the analysis or the re-analysis) using a deterministic process, e.g., based on one or more of the term features 302 such as the data class. Alternatively, or in addition, each term assignment can result from a machine-learning (ML) process. The ML process can use natural language processing of text included in the assets (e.g., word embedding or sentence embedding) or unsupervised clustering (e.g., k-means clustering).

An assignment feature vector (AFV) 700 is determined and stored with each term assignment, e.g., each assignment of a term 300 to an asset 600 resulting from the analysis (or re-analysis), which is illustrated schematically in FIG. 7. For example, each deterministic process for the analysis based on the data class can assign a component, such as the value 10 indicated in FIG. 7, corresponding to the data class as a term feature 302 of the term 300. The value can indicate if there is a perfect match of data classes or can quantify an overlap of the data class of the asset 600 and the data class of the term 300. Alternatively, or in addition, an ML process for the analysis can assign a component, such as the value "5" indicated in FIG. 7, corresponding to the description as a term feature 302 of the term 300. The value can indicate a confidence and/or importance of the respective term feature (e.g., the description used for natural language processing) underlying the term assignment.

Any embodiment of the disclosed techniques can be used when working in the data governance space, e.g., when members of an organization maintain a term ontology 200 (e.g., a glossary of the organization) which can be a set of governance and data related terms 204 represented by a tree or graph structure. The terms 204 are described in natural language, so that the organization understands it, can speak a common language, and has an organization-specific or technology-specific terminology to tag or classify data sets as examples of the assets 600. As the organization evolves, the term ontology 200 does not remain static but will change frequently over time. Whenever there are critical changes (e.g., a change that exceeds a predefined change threshold value) to the term ontology 200, data sets 600 that are assigned to the terms 300 of the term ontology 200 need to be updated and re-analyzed to reflect the most current state and term 300. This conventional process is expensive and a re-analysis of all data sets 600 can take several months depending on the change.

Changes to a term ontology 200 can comprise, e.g., term name changes, new terms, removed terms, term description changes, term relation changes, term splits, or term unions. Dependent on the changes, a smaller or larger number of the data sets 600 (e.g., the term assignments of data sets 600) can be impacted by the change.

Embodiments of the disclosed techniques can provide a way to identify the assets 600 which are most likely to be impacted by a change of the term ontology 200. In some embodiments, this can be done by determining (e.g., computing) an "impact score value" for the assets 600. The higher the impact score value, the more likely it will be that the term assignment of the asset 600 will change in a subsequent re-analysis, or the term assignment confidences on the asset will improve (e.g., the confidences of individual assigned terms) or the term assignment quality will improve (e.g., better terms are found).

Embodiments of the disclosed techniques improve the quality of the term assignments in a shorter amount of time as compared to prior techniques, e.g., since only relevant assets 600 are re-analyzed as identified, 106, and with less resources, e.g., since fewer re-analyses are performed, 108.

At the same time, a data lake can be kept up to date with the term ontology 200 and can reduce the amount of stale assets 600 with respect to the term ontology 200.

Any embodiment of the method 100 can comprise at least one of the following steps. When there is a change in an organization glossary (as an example of the term ontology 200), the method 100 determines, 104 (e.g., computes) a vector for a domain of the affected area in the term ontology 200 that changed. The latter vector is referred to as DFCV. Alternatively, or in addition, the method 100 determines, 104, a TFCV for the change.

Based on at least one or both of those two vectors, a set of assets 600 is identified, e.g., mainly by the affected domain or because of the affected term, as potential candidates for a re-analysis. For every candidate asset, an impact score is determined with the AFV 700 and the TFCV or DFCV. The higher the impact score value, the higher the likelihood that a re-analysis of the asset 600 will update the term assignments.

During the re-analysis of the assets, which is carried out in descending order using the impact score value, the processing (e.g., further re-analysis) is stopped as soon as no further term assignment changes based on the impact score value are recognized.

Embodiments of the method 100 can have at least one of the following properties:

analyzing the most affected assets first;

stopping use of processing resources when the re-analysis 108 does not yield any changes; and guaranteeing that the data lake is up to date with the term ontology 200.

Herein, at least one of the following definitions can apply in addition to the definitions above.

The "domain" 206 can comprise one or more inner nodes of a term hierarchy. The terms of a domain can all be terms that are descendants of those nodes. Terms can be added to domains on creation.

The "asset" 600 can be an object in the catalog 500 that can have terms 300 assigned to it.

The "term assignment" can be a relation between an asset 600 and a term 300, optionally comprising at least one of the following properties: a confidence value, information how this term assignment was created, e.g., the process that was used for the analysis (e.g., the type of the analysis), and the AFV.

The "analysis" or "re-analysis" can be a process used in the system to automatically create term assignments. An example embodiment can use multiple of these processes (e.g., different types of analysis) and, optionally, can comprise a supervisor component that selects and/or combines all candidate term assignments to an actual term assignment in the catalog 500.

The "term feature" 302 (or briefly "feature") can be properties of a term 300 that are used by the analysis (or re-analysis) for the term assignment. Examples of the features 302 comprise a name, a description, relationships to other terms 300, relationships to other assets 600, and synonyms.

The "assignment feature vector" 700 (AFV) can be determined for a term assignment. Each component (e.g., entry) in this vector can represent the factor of how important a certain feature was for the decision to create this very term assignment. Some processes for the term assignment can be configured to provide the AFV 700. For those who cannot, one can use a static AFV 700 for each algorithm.

FIG. 8 shows a block diagram of an embodiment of the re-analysis system 800 for assignments of terms to assets. The re-analysis system 800 comprises a processor 802 and a memory 804, the memory 804 being operatively coupled to the processor 802, wherein the memory 804 stores program code portions, which, when executed by the processor 802, enable the processor 802, to detect by a detection module 806 a change in a term ontology comprising a plurality of terms, and to determine by a determination unit

808 at least one of a domain feature change vector (DFCV) for a domain of the term ontology affected by the change, and a term feature change vector (TFCV) for the term affected by the change.

The processor 802 of the re-analysis system 800 is further configured to identify, by an identification unit 810, assets for the re-analysis of the assignments of terms, where each of the identified assets is associated with an impact score value based on the determined at least one of the DFCV and the TFCV, and to perform the re-analysis, by a trigger module 812, and for executing a call, by the re-analysis module, of the assignments of terms for the identified assets ordered by the impact score value.

It shall also be mentioned that all functional units, modules, and functional blocks, including the processor 802, the memory 804, the detection module 806, the determination unit 808, the identification unit 810, and the trigger module 812, can be communicatively coupled to each other for signal or message exchange in a selected 1:1 manner. Alternatively, the functional units, modules and functional blocks can be linked to a system internal bus system 814 for a selective signal or message exchange. Any of the detection module 806, the determination unit 808, the identification unit 810, and the trigger module 812 can be processor-executable program code that when executed by a processor is configured to perform its respective functions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 9 shows a computing environment 900 comprising an example of an environment for the execution of at least some of the computer code involved in performing the disclosed methods, such as block 950 containing computer code that implements the computer-implemented method for a re-analysis of assignments of terms to assets described earlier.

In addition to block 950, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 950, as identified above), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method can be distributed among multiple computers and/or between multiple locations. On the other hand, in this presentation of computing environment 900, detailed discussion is focused on a single computer, specifically computer 901, to keep the presentation as simple as possible. Computer 901 can be located in a cloud, even though it is not shown in a cloud in FIG. 9. On the other hand, computer 901 is not required to be in a cloud except to any extent as can be affirmatively indicated.

PROCESSOR SET 910 includes one, or more, computer processors of any type now known or to be developed in the future. Processing circuitry 920 can be distributed over multiple packages, for example, multiple, coordinated integrated circuit chips. Processing circuitry 920 can implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set can be located "off chip." In some computing environments, processor set 910 can be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 921 and the other storage media discussed below. The program instructions, and associated data, are accessed by processor set 910 to control and direct performance of the disclosed methods. In computing environment 900, at least some of the instructions for performing the disclosed methods can be stored in block 950 in persistent storage 913.

COMMUNICATION FABRIC 911 is the signal conduction paths that allow the various components of computer 901 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory can be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 can be a read only memory (ROM), but typically at least a portion of the persistent storage allows writing of data, deletion of data and re-writing of data. Some familiar forms of persistent storage include magnetic disks and solid state storage devices. Operating system 922 can take several forms, such as various known proprietary operating systems or open source Portable Operating System Interface type operating systems that employ a kernel. The code included in block 950 typically includes at least some of the computer code involved in performing the disclosed methods.

PERIPHERAL DEVICE SET 914 includes the set of peripheral devices of computer 901. Data communication connections between the peripheral devices and the other components of computer 901 can be implemented in various ways, such as Bluetooth connections, Near-Field Communication (NFC) connections, connections made by cables (such as universal serial bus (USB) type cables), insertion type connections (e.g., secure digital (SD) card), connections made through local area communication networks and even connections made through wide area networks such as the internet. In various embodiments, UI device set 923 can include components such as a display screen, speaker, microphone, wearable devices (such as goggles and smart watches), key board, mouse, printer, touchpad, game controllers, and haptic devices. Storage 924 is external storage, such as an external hard drive, or insertable storage, such as an SD card. Storage 924 can be persistent and/or volatile. In some embodiments, storage 924 can take the form of a quantum computing storage device for storing data in the form of qubits. In embodiments where computer 901 is required to have a large amount of storage (for example, where computer 901 locally stores and manages a large database) then this storage can be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor can be a thermometer and another sensor can be a motion detector.

NETWORK MODULE 915 is the collection of computer software, hardware, and firmware that allows computer 901 to communicate with other computers through WAN 902. Network module 915 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (e.g., embodiments that utilize software-defined networking (SDN)), the control functions and the forwarding functions of network module 915 are performed on physically separate devices, such that the control functions manage several different network hardware devices. Computer readable program instructions for performing the disclosed methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and can take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 can be a client device, such as thin client, heavy client, mainframe computer, desktop computer and so on.

REMOTE SERVER 904 is any computer system that serves at least some data and/or functionality to computer 901. Remote server 904 can be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data can be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs can be stored as images and can be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

It should also be mentioned that the re-analysis system 800 for assignments of terms to assets can be an operational sub-system of the computer 901 and can be attached to a computer-internal bus system.

The terminology used herein is for the purpose of describing particular embodiments only and is not intended to limit the disclosure. As used herein, the singular forms of "a", "an", and "the" are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope and spirit of the present disclosure. The embodiments are chosen and described in order to best explain the principles of the present disclosure and the practical application, and to enable others of ordinary skills in the art to understand the present disclosure for various embodiments with various modifications, as are suited to the particular use contemplated.

What is claimed is:

1. A computer-implemented method for a re-analysis of assignments of terms to assets, comprising:

detecting a change associated with a term in a term ontology comprising a plurality of terms assigned to the assets, wherein the term ontology is stored in a computer-readable memory as an ontology data structure comprising nodes representing terms and edges representing relationships between the terms, each node storing feature data for a corresponding term;

determining at least one selected from a group consisting of: a Domain Feature Change Vector (DFCV) for a domain of the term ontology affected by the change, and a Term Feature Change Vector (TFCV) for a term affected by the change, wherein the DFCV and the TFCV are derived by traversing the ontology data structure to identify affected nodes and relationships;

identifying assets for the re-analysis of the assignments of terms, wherein each of the assets is associated with an impact score value that is determined based on at least one selected from a group consisting of: a scalar product of the DFCV and an assignment feature vector (AFV) of each term assigned to a respective one of the assets, and a scalar product of the TFCV and the AFV of each term assigned to a respective one of the assets;

performing the re-analysis of the assignments of terms for the assets ordered by the impact score value until an associated impact score value is equal to or less than a threshold value; and updating one or more nodes of the ontology data structure affected by the re-analysis to update one or more of the assignments of terms for the assets based on the impact score value.

2. The computer-implemented method of claim 1, wherein the identified assets are selected for the re-analysis if an associated impact score value is equal to or greater than a predefined first threshold value.

3. The computer-implemented method of claim 1, wherein the re-analysis is performed in an order of decreasing impact score values, and/or wherein the impact score values associated with the assets are indicative of at least one selected from a group consisting of:

a likelihood for a change of the assignments of terms to respective assets, an expected change of an assignment confidence value for the terms assigned to the respective assets, and an expected change of assignment quality value due to a change of the assignments of terms to the respective assets.

4. The computer-implemented method of claim 1, wherein the change in the term ontology comprises at least one selected from a group consisting of:

a term being added to the term ontology, a term being removed from the term ontology, a change of a term name of the term in the term ontology, a change of a term description of the term in the term ontology, a change of a term relation between at least two of the terms in the term ontology, a term split of a term in the term ontology, and a term union of at least two of the terms in the term ontology.

5. The computer-implemented method of claim 1, wherein each of the assignments of terms comprises at least one selected from a group consisting of:

an assignment confidence value indicative of a confidence that an assigned term matches a respective asset, an indicator of a type of an analysis of the respective asset used to create the assignment, an indicator of a type of the re-analysis of the respective assignment, and an assignment feature vector (AFV), wherein components of the AFV are indicative of a weight value for each feature of the assigned term, wherein the analysis or the re-analysis determines whether or not to assign the term to the respective asset depending on the features weighted according to the respective weight values.

6. The computer-implemented method of claim 5, wherein the features of the terms comprise at least one selected from a group consisting of:

a name of the respective term, a description of the respective term, a term relation of the respective term to one or more other terms in the term ontology, an asset relation of the respective term to one or more other assets, a data class of the respective term, a classification of the respective term, and a domain in the term ontology which comprises the respective term.

7. The computer-implemented method of claim 1, wherein the assets are identified, or the impact score values are determined, based on the TFCV when a change of a single term in the term ontology is detected, or wherein the assets are identified or the impact score values are determined based on the DFCV when the detected at least one change comprises at least one selected from a group consisting of: changes of multiple terms in the term ontology, a term being added to the term ontology, and a term being removed from the term ontology.

8. The computer-implemented method of claim 1, wherein components of the TFCV comprise a predefined or maximum value for each feature of a removed term or for each feature of an added term, or wherein one or more components of the TFCV are zero when the corresponding one or more features of the term are not affected by the determined at least one change, or wherein the DFCV of a domain of the term ontology is a sum of the TFCVs determined for the terms in the domain.

9. The computer-implemented method of claim 1, wherein the assets are physical assets, customer tables, documents, or metadata of source assets.

10. The computer-implemented method of claim 1, further comprising:

using a machine learning system or a data classification system for the identification of the assets or for the determination of the impact score values.

11. The computer-implemented method of claim 10, wherein the machine learning system is continuously retrained based on new data of a first or second threshold value for changes of the assignments of the terms.

12. A re-analysis system for assignments of terms to assets, comprising:

one or more computer readable storage media storing program instructions and one or more processors which, in response to executing the program instructions, are configured to:

detect a change associated with a term in a term ontology comprising a plurality of terms assigned to one or more assets, wherein the term ontology is stored in the one or more computer readable media as an ontology data structure comprising nodes representing terms and edges representing relationships between the terms, each node storing feature data for a corresponding term;

determine at least one selected from a group consisting of: a Domain Feature Change Vector (DFCV) for a domain of the term ontology affected by the change, and a Term Feature Change Vector (TFCV) for a term affected by the change, wherein the DFCV and the TFCV are derived by traversing the ontology data structure to identify affected nodes and relationships;

identify assets for the re-analysis of the assignments of terms, wherein each of the assets is associated with an impact score value that is determined based on at least one selected from a group consisting of: a scalar product of the DFCV and an assignment feature vector (AFV) of each term assigned to a respective one of the assets, and a scalar product of the TFCV and the AFV of each term assigned to a respective one of the assets;

perform the re-analysis of the assignments of terms for the assets ordered by the impact score value until an associated impact score value is equal to or less than a threshold value; and update one or more nodes of the ontology data structure affected by the re-analysis to update one or more of the assignments of terms for the assets based on the impact score value.

13. The re-analysis system of claim 12, wherein the identified assets are selected for the re-analysis when the associated impact score value is equal to or greater than a predefined first threshold value.

14. The re-analysis system of claim 12, wherein the program instructions are further configured to cause the one or more processors to:

perform the re-analysis in an order of decreasing impact score values, wherein the impact score values associated with the assets are indicative of at least one selected from a group consisting of:

a likelihood for a change of the assignments of terms to the respective assets, an expected change of an assignment confidence for the terms assigned to the respective assets, and an expected change of assignment quality value due to a change of the assignments of terms to the respective assets.

15. The re-analysis system of claim 14, wherein the change in the term ontology comprises at least one selected from a group consisting of:

a term being added to the term ontology, a term being removed from the term ontology, a change of a term name of the term in the term ontology, a change of a term description of the term in the term ontology, a change of a term relation between at least two of the terms in the term ontology, a term split of a term in the term ontology, and a term union of at least two of the terms in the term ontology.

16. The re-analysis system of claim 12, wherein each of the assignments of terms comprises at least one selected from a group consisting of:

an assignment confidence value indicative of a confidence that the assigned term matches the respective asset, an indicator of a type of an analysis of the respective asset used to create the assignment, an indicator of a type of the re-analysis of the respective assignment, and an assignment feature vector (AFV), wherein components of the AFV are indicative of a weight value for each feature of the assigned term, wherein the analysis or the re-analysis determines whether or not to assign the term to the respective asset depending on the features weighted according to the respective weight values.

17. A computer program product for a re-analysis of assignments of terms to assets, the computer program product comprising a computer readable storage medium having program instructions embodied therewith, the program instructions being executable by one or more computing systems or controllers to cause the one or more computing systems to:

detect a change associated with a term in a term ontology comprising a plurality of terms assigned to one or more assets, wherein the term ontology is stored in a computer-readable memory as an ontology data structure comprising nodes representing terms and edges representing relationships between the terms, each node storing feature data for a corresponding term;

determine at least one selected from a group consisting of: a Domain Feature Change Vector (DFCV) for a domain of the term ontology affected by the change, and a Term Feature Change Vector (TFCV) for a term affected by the change, wherein the DFCV and the TFCV are derived by traversing the ontology data structure to identify affected nodes and relationships;

identify assets for the re-analysis of the assignments of terms, wherein each of the assets is associated with an impact score value that is determined based on at least one selected from a group consisting of: a scalar product of the DFCV and an assignment feature vector (AFV) of each term assigned to a respective one of the assets, and a scalar product of the TFCV and the AFV of each term assigned to a respective one of the assets;

perform the re-analysis of the assignments of terms for the assets ordered by the impact score values until an associated impact score value is equal to or less than a threshold value; and update one or more nodes of the ontology data structure affected by the re-analysis to update one or more of the assignments of terms for the assets based on the impact score value.

* * * * *